United States Patent [19]

Ishikawa

[11] 3,857,656

[45] Dec. 31, 1974

[54] APEX SEAL FOR A ROTARY INTERNAL COMBUSTION ENGINE

[75] Inventor: Yoshikazu Ishikawa, Tokyo, Japan

[73] Assignee: Nissan Motor Company, Limited, Yokohama City, Japan

[22] Filed: May 17, 1973

[21] Appl. No.: 361,266

[52] U.S. Cl. .............................. 418/120, 418/113
[51] Int. Cl. ............................................ F01c 19/02
[58] Field of Search ........... 418/113, 122, 123, 124, 418/120, 121

[56] References Cited
UNITED STATES PATENTS 3,193,189  7/1965  Rastogi ............................. 418/122
3,712,767  1/1973  Beutter ............................. 418/122

*Primary Examiner*—C. J. Husar
*Assistant Examiner*—O. T. Sessions

[57] ABSTRACT

An apex seal comprising a central element and two end elements, the effective length of which is automatically adjusted to compensate for local differences in spacing between the engine side walls caused by thermal expansion during operation of the engine.

1 Claim, 9 Drawing Figures

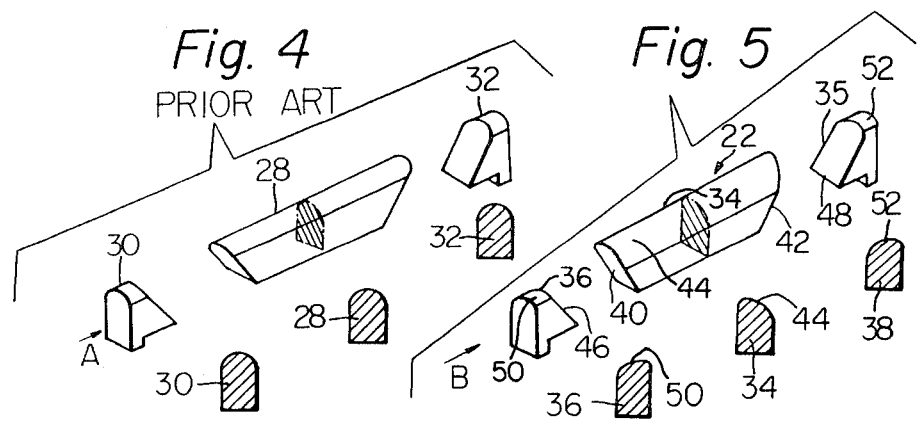
Fig. 4 PRIOR ART
Fig. 5
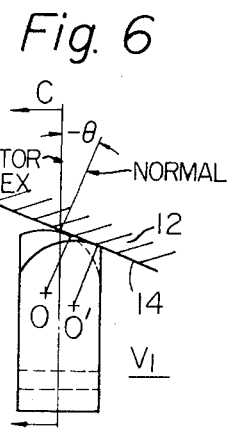
Fig. 6
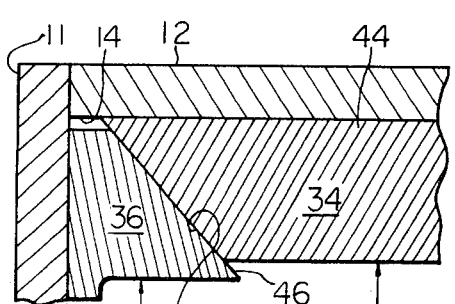
Fig. 7
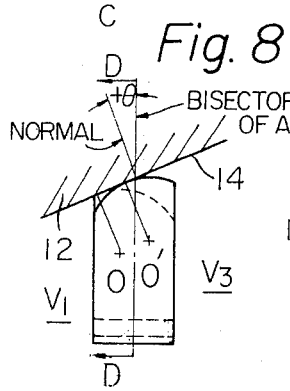
Fig. 8
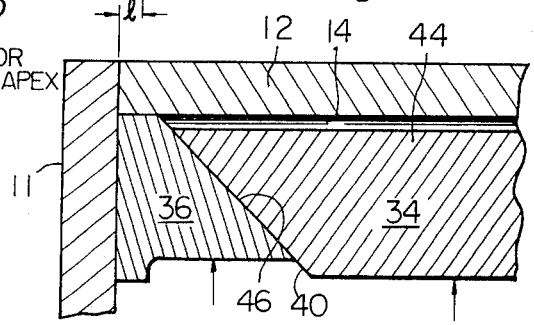
Fig. 9

APEX SEAL FOR A ROTARY INTERNAL COMBUSTION ENGINE

The present invention relates to an apex seal arrangement for a rotary internal combustion engine.

In general, rotary internal combustion engines of the Wankel type comprise a housing having axially spaced end walls having substantially flat inner surfaces and a peripheral wall interconnecting the end walls to define a cavity therebetween, the inner surface of the peripheral wall defining a two-lobed epitrochoid. A generally triangular or three-lobed rotor is journalled in the cavity on an eccentric portion of a shaft which is coaxial with the cavity and journalled in the end walls. The rotor has substantially flat end faces disposed adjacent to the inner flat faces of the end walls and has a peripheral surface with three circumferentially spaced apex portions which carry radially movable apex seals which are in substantially continuous sliding, gas-sealing contact with the inner surface of the peripheral wall of the housing, to form three working chambers between the rotor and the housing which vary in volume during the rotation of the piston as the shaft rotates to perform a four-cycle operation. In order to assure the sealing engagement of each apex seal with the epitrochoidal surface, the seal is urged by spring means or the like toward the epitrochoidal surface and outward from the apex of the rotor.

The four-cycle rotary internal combustion engine of the type above described differs from conventional four-cycle reciprocating piston internal combustion engines in that ignition and combustion always occur at the same place in the housing and thus set up localized thermal gradients of considerable magnitude. Other parts of the housing of the engine are cooled and scavenged by a fresh charge introduced in the course of each cycle. These temperature gradients create a pronounced increase in the distance between the end walls at places where the combustion and exhaust strokes occur.

Although high temperature differences occur which cause thermal deformation of the material, and high pressure differences exist between adjacent working chambers, the apex seals must not fail to effectively seal one working chamber from the others. It is known that high pressure differences occur between the compression working chamber (i.e., a working chamber performing the compression stroke) and adjacent working chambers. Thus it is the conventional practice to urge an apex seal toward the epitrochoidal surface with a force sufficient to overcome the pressure difference between the adjacent working chambers to be sealed by the apex seal. This is done in an effort to provide fully satisfactory sealing engagement of the apex seal with the epitrochoidal surface even though a high pressure difference occurs between adjacent working chambers to be sealed by the apex seal. However, this method of sealing of one from another of adjacent working chambers has proven unsatisfactory when the working chambers have moved to a position in the housing where the distance between the end walls has increased due to local thermal gradients. The apex seal thus does not span the entire distance between the end walls and gas leakage between the apex seal and the adjacent inner flat faces of the end walls occurs.

Accordingly it is one object of the present invention to provide an apex seal which expands or contracts transversely within an apex of an rotor so as to at all times sealingly and slidably contact the adjacent inner flat faces of the end walls and also the inner peripheral surface of the housing.

An apex seal according to the present invention is carried, as in the conventional manner, in a groove in an apex portion of the rotor. A groove for accommodating the apex seal is formed in the conventional manner, arranged to extend inwardly from the apex and be bisected by the bisector of the apex. It is known that the bisector of the apex of the rotor is normal to the adjacent epitrochoidal surface only at a time when it coincides with an axis of the epitrochoid. At all intermediate positions there is an angle X formed between the perpendicular to the epitrochoid and the bisector of the apex which varies continuously in magnitude and changes polarity several times during one complete revolution of the rotor. Accordingly, the portion of an apex seal which slidably contacts the epitrochoidal inner surface varies continuously during rotation of the rotor. If the rotor is at a top dead center (TDC) position, defined as that at which a rotor lobe is positioned between the intake and exhaust ports of the engine and the bisector of the lobe coincides with the minor axis of the epitrochoid, the other two apices are equidistant from the minor axis of the epitrochoid, and at this point the angles between the bisectors of these other two apices and perpendiculars to the adjacent portions of the epitrochoidal surface are equal in magnitude, having a value of $\theta$, but opposite in polarity. This angular relationship is effectively utilized to expand or contract the length of an apex seal according to the present invention.

The present invention will be more particularly described with reference to the accompanying drawings which illustrates one preferred embodiment of the present invention and one prior art apex seal.

FIG. 1 shows a housing of a Wankel rotary internal combustion engine and a curve representing the distribution of temperature on the inner surface thereof, in which a vector extending normally outward from the inner epitrochoidal surface of the housing to the curve represents the magnitude of temperature at that point;

FIG. 2 shows a housing and rotor of a Wankel rotary internal combustion engine and a curve representing the difference in pressure between portions of two working chambers adjacent to a common apex seal at all positions of the rotor within the housing, in which a vector extending normally outward from the inner epitrochoidal surface of the housing to the curve represents the magnitude of the pressure difference at that point;

FIG. 4 is a perspective exploded view of a prior art apex seal having one center seal element and two end seal elements, cross sectional views (as viewed normal to an arrow A) of the elements being shown;

FIG. 5 is a perspective exploded view of an embodiment of an apex seal of the present invention, cross sectional views (as viewed normal to an arrow B) of the elements being shown;

FIG. 6 is an enlarged view of a portion T of FIG. 3, and illustrates the relationship between the epitrochoidal inner surface of the inner peripheral wall of the housing and an embodiment of an apex seal according to the present invention, the rotor being removed for the sake of clarity;

FIG. 7 is a sectional view taken through a line C—C of FIG. 6;

FIG. 8 is an enlarged schematic view of a portion L of FIG. 3 and illustrates the relationship between the epitrochoidal inner surface of the inner peripheral wall of the housing and an embodiment of an apex seal of the present invention, the rotor being removed for the sake of clarity; and FIG. 9 is a sectional view taken through a line D—D of FIG. 8.

Figure 1:
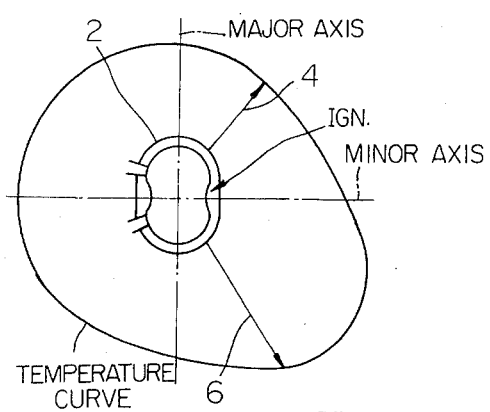
Figure 2:
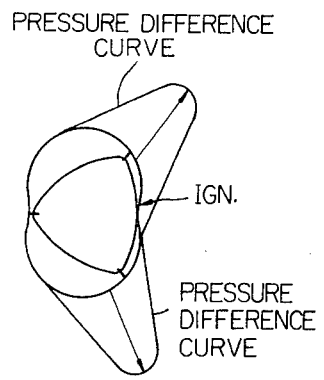

As will be seen from FIG. 1, the temperature is relatively greatest at the inner surface of a housing 2 within the lower right-hand quadrant of the figure as shown, which corresponds to the area in which the initial stages of gas expansion are performed in working chambers defined by the housing 2 and a three-lobed engine rotor (not shown), as is well known in the art. Vectors 4 and 6 in FIG. 1 represent temperatures at two places where adjacent working chambers are to be sealed by apices of the rotor when the rotor is at TDC. The vector 6 is greater in magnitude than the vector 4. It follows that when the rotor is at TDC, it is quite difficult to seal the compression working chamber from adjacent working chambers because there is a significant difference in width between the end walls at the two places to be sealed, and because the pressure differences between the compression chamber and the adjacent working chambers are considerably high as will be understood from FIG. 2.

Figure 3:
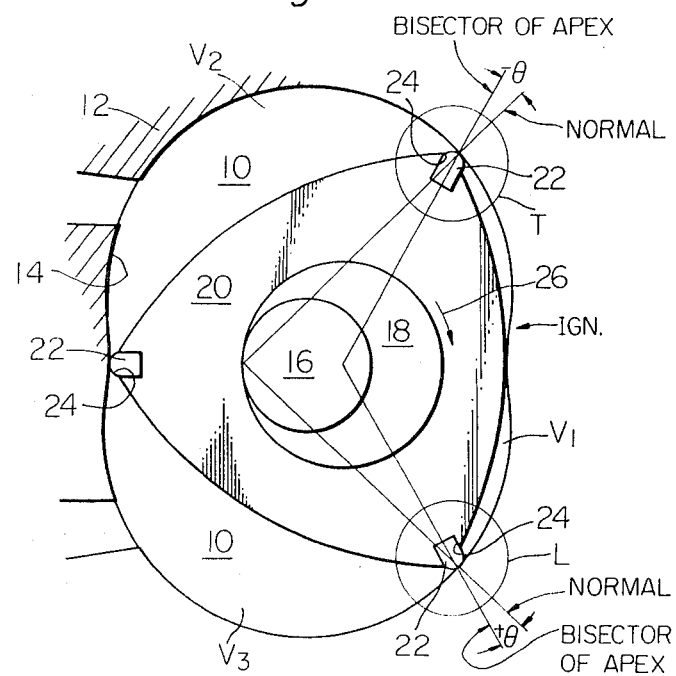
FIG. 3 is a diagrammatic view of a housing and rotor of a Wankel rotary internal combustion engine, which illustrates the angular relationship between the perpendiculars to the epitrochoidal surface and the bisector of each of two adjacent apices when the rotor is at TDC.

In FIG. 3 there is shown a portion of a rotary internal combustion engine which comprises a housing (no numeral) having axially spaced end walls, one of which is shown and designated by a reference numeral 10 (the other being shown in FIGS. 7 and 8 and designated as 11), both having substantially flat faces (no numerals) and a peripheral wall 12 interconnecting the end walls to form a cavity therebetween. The inner surface 14 of the peripheral wall 12 has a two-lobed profile which is basically an epitrochoid. A shaft 16 extends coaxially through the cavity. Eccentrically disposed in the housing and journalled on an eccentric portion 18 of the shaft 16 is a three-lobed rotor 20 having three circumferentially spaced apex portions (no numerals) defining its periphery. Embodiments of apex seals 22 according to the present invention are accommodated in grooves 24 and urged toward the epitrochoidal inner surface 14 of the housing by spring means (not shown) in a conventional manner. The grooves 24 for accommodating the apex seals 22 are symmetrically arranged to extend inwardly from each apex of the rotor 20 and be bisected by the bisector of the respective apex. In FIG. 3 the rotor 20 is at TDC and will rotate therefrom in the direction of arrow 26. A compression chamber $V_1$ is sealed from the adjacent chamber $V_2$ by the intervening apex seal 22 within a portion T and is sealed from the adjacent chamber $V_3$ by the intervening apex seal 22 within a portion L. The bisector of the apex in the portion T and the perpendicular to the epitrochoidal surface 14 at the point where the bisector of the apex intersects therewith form therebetween an angle $+\theta$, whereas the bisector of the apex in the portion L and the perpendicular to the epitrochoidal surface 14 similarly form therebetween an angle $-\theta$.

FIG. 4 shows a prior art apex seal of a type which comprises one central seal element 28 and two end apex seals 30 and 32 which obliquely slidably abut with the central seal element 28. As will be seen, the sectional profiles of the elements 28, 30 and 32 are identical.

FIG. 5 shows the shape of each element of an embodiment of an apex seal 22 according to the present invention. The apex seal 22 comprises one central apex seal element or central apex seal 34, two end apex seal elements 36 and 38 similarly with the prior art of FIG. 4. However, the sectional profile of the central apex seal 34 of the apex seal 22 of the present invention is not the same as that of the end apex seal elements 36 and 38.

Referring also to FIGS. 6 to 9, a central apex seal element 34 and two end apex seal elements 36 and 38 are slidably received in each apex of the rotor 20. The central apex seal element 34 has oblique end faces (no numerals) formed at ends 40 and 42 thereof and a curved top portion 44 which extends out of the apex to slidably and sealably contact the inner surface 14 of the peripheral wall 12. Sealingly and obliquely slidable on the oblique end sections 40 and 42 of the central apex seal element 34 are oblique sections 46 and 48 of the end apex seal elements 36 and 38, respectively. Both end apex seal elements 36 and 38 have curved top portions 50 and 52 which slidably and sealably contact the inner surface 14. The curved top portion 50 is identical with the curved top portion 52 in sectional profile, as will be understood from FIG. 5. As can be seen from FIGS. 6 or 8, the center of the radius of curvature of the curved top portion 50 or 52 and that of the curved top portion 44 are disposed on opposite sides of and approximately equidistant from the bisector of the apex. Furthermore it will be noted that the center of the radius of curvature of the curved top portion 44 is spaced behind the bisector of the apex in the direction of rotation of the rotor 20, whereas the centers of the radii of curvature of the curved top portions 50 and 52 are spaced ahead of the bisector of the apex in the direction of rotation of the rotor 20. It will now be appreciated that the effective length of the apex seal 22 of the present invention can change as the angular relationship between the bisector of the apex and the perpendicular to the epitrochoidal inner surface 14 changes.

From the foregoing description it will now be understood that an apex seal of the present invention can conform its effective length to the width between the inner flat faces of the end walls 10 and 11 even if the width between the end walls in the portion L is greater by a distance $l$ than that in the portion T (see FIGS. 7 and 8).

As will be seen from FIGS. 6 and 7, when an apex seal 22 of the invention is in the portion T, the bisector of the apex is oriented behind the perpendicular to the inner surface 14 in the direction of rotation of the rotor 20 by the angle $\theta$. At this position, due to the respective curvatures of the top portion 44 and curved top portions 50 and 52, the end apex seal elements 36 and 38 are relatively retracted into the groove 24, whereas the central apex seal 34 is relatively extended from the groove 24 through abutting contact between the elements 34, 36, and 38 and the inner surface 14. It will be appreciated that in this position, the effective length of the apex seal 22 is relatively short due to the oblique engagement between the oblique end faces of the central apex seal 34 and the oblique sections 46 and 48 of the end apex seal elements 36 and 38.

In a similar manner, when an apex seal 22 is in the portion L, as seen in FIGS. 8 and 9, the bisector of the apex is oriented ahead of the perpendicular to the inner surface 14, the end apex seal elements 36 and 38 are relatively extended from the groove 24, and the central apex seal 34 is relatively retracted into the groove 24. Thus, the effective length of the apex seal 22 is relatively long, and specifically longer than the effective length in the portion T by the distance $l$.

Thus, it will be appreciated that an apex seal of the invention automatically adjusts its length to compensate for thermal deformation of the end walls of the housing of the engine, and specifically increases its length in the expansion region of the housing where the width between the end walls is greatest.

As can be seen from FIG. 1 that the expansion of the width between the end walls of the housing in the area of the intake and exhaust ports is relatively small, and there is created in this area a slight gap between the end apex seal elements 36 and 38 and the inner surface 14, although the central apex seal 34 directly contacts the inner surface 14, but since the pressure differences between adjacent working chambers are relatively low in the area of the intake and exhaust ports, gas leakage through the apex seals between adjacent working chambers is negligible.

It will be appreciated that an apex seal according to the present invention is industrially promising since gas leakage between a compression chamber and adjacent chambers can be sealed effectively even if the width between the end walls at the portion L (see FIG. 9) is greater than that at the portion T (see FIG. 7).

What is claimed is:

1. An apex seal for a rotary internal combustion engine having a rotor with a plurality of apices, which comprises: a central apex seal element transversely disposed in each apex of the rotor having a different oblique end section formed at each end thereof, said central apex seal element having a curved top portion extending along the length thereof; and two end apex seal elements longitudinally aligned with the central apex seal element, each having an oblique section sealingly and obliquely slidable on the adjacent oblique section of said central apex seal element, each said end apex seal element having a curved top portion extending along the length thereof, the center of the radius of curvature of the curved top portion of said central apex seal element and the center of the radius of curvature of one of said end apex seal elements being disposed on the opposite sides of and approximately equidistant from the bisector of the apex.

* * * * *